US00RE50701E

(19) United States
(12) Reissued Patent
Mullins

(10) Patent Number: US RE50,701 E
(45) Date of Reissued Patent: Dec. 16, 2025

(54) TABLE TENNIS TOP AND MATERIAL

(71) Applicant: Gaelan Mullins, Columbus, OH (US)

(72) Inventor: Gaelan Mullins, Columbus, OH (US)

(21) Appl. No.: 18/414,271

(22) Filed: Jan. 16, 2024

Related U.S. Patent Documents

Reissue of:
(64) Patent No.: 11,224,790
Issued: Jan. 18, 2022
Appl. No.: 17/397,988
Filed: Aug. 10, 2021

U.S. Applications:
(60) Provisional application No. 63/192,669, filed on May 25, 2021.

(51) Int. Cl.
*A63B 67/04* (2006.01)
*A47B 13/00* (2006.01)
(Continued)

(52) U.S. Cl.
CPC ..... *A63B 67/04* (2013.01); *A47B 13/003* (2013.01); *A47B 13/083* (2013.01); *A47B 25/003* (2013.01); *A47B 96/206* (2013.01); *A63B 2102/16* (2015.10); *A63B 2209/02* (2013.01); *A63B 2225/093* (2013.01)

(58) Field of Classification Search
CPC ..... A47B 13/021; A47B 2003/0821; A47B 2003/0824; A47B 96/206; A47B 25/003; A47B 13/003–2013/006; A63B 67/04; A63B 2102/16; F16B 5/01; Y10T 428/24777
See application file for complete search history.

(56) References Cited

U.S. PATENT DOCUMENTS 2,661,990 A * 12/1953 Knuth ..... A47B 77/022 108/42
2,837,389 A * 6/1958 Brown ..... A47B 13/00 108/49
(Continued)

FOREIGN PATENT DOCUMENTS

CN 202820191 U * 3/2013
CN 206081541 U 4/2017
(Continued)

OTHER PUBLICATIONS

English machine translation of FR-2670122-A1 (Ekeloo) (Year: 1992).*
(Continued)

*Primary Examiner* — Laura Davison
(74) *Attorney, Agent, or Firm* — The Law Office of Patrick F. O'Reilly III, LLC

(57) ABSTRACT

A table tennis apparatus including a table top made out of a fiberglass reinforced structural material (FRSM). The table tennis apparatus includes a pair of tables. Each table includes a table top having a three-layered composite panel made up of FRSM. The table top receives aluminum plates at its sides. Further, the table top receives mounting brackets at its bottom surface. The mounting brackets include male members that extend perpendicularly to the mounting brackets and fold over the mounting brackets. The table top rests at a height from the ground and allows its top surface to act as a playing surface for playing table tennis.

22 Claims, 11 Drawing Sheets

(51) Int. Cl.

| | |
|---|---|
| ***A47B 13/08*** | (2006.01) |
| ***A47B 25/00*** | (2006.01) |
| ***A47B 96/20*** | (2006.01) |
| *A63B 102/16* | (2015.01) |

(56) References Cited

U.S. PATENT DOCUMENTS

| | | | | | |
|---|---|---|---|---|---|
| 3,547,054 | A * | 12/1970 | Caldwell | A47B 3/0815 | 108/115 |
| 4,142,718 | A | 3/1979 | Luckey | | |
| 4,989,863 | A * | 2/1991 | Hall | A63D 15/00 | 473/29 |
| 5,275,862 | A * | 1/1994 | Ramadan | A47B 13/08 | 428/113 |
| 5,375,837 | A * | 12/1994 | Moreau | A47B 25/003 | 473/496 |
| 6,729,982 | B1 * | 5/2004 | Appelbaum | A63B 67/002 | 108/11 |
| 8,920,593 | B2 * | 12/2014 | Legrand | F16B 37/067 | 411/113 |

FOREIGN PATENT DOCUMENTS

| | | | | |
|---|---|---|---|---|
| CN | 108325188 | A | 7/2018 | |
| FR | 2670122 | A1 * | 6/1992 | A47B 13/021 |
| IT | 1232473 | B * | 2/1992 | |

OTHER PUBLICATIONS

English machine translation of IT-1232473-B (Dario) (Year: 1992).*

English machine translation of CN-202820191-U (Han) (Year: 2013).*

Yasin, Mohamad R.M., "Characterization of Light Weight Composite Panels for Table Tennis Table," International Journal of Engineering Technology and Sciences (IJETS), vol. 2 (1), Dec. 2014 (Year: 2014).*

Shur-Lok Corporation, "Design Manual: Fasteners for Sandwich Structure," copyright 1996 (Year: 1996).* https://findanyanswer.com/can-i-use-expanding-foam-as-an-adhesive (Year: 2020).* https://www.nationalrivet.com/threaded-fasteners.htm (Year: 2007).*

* cited by examiner

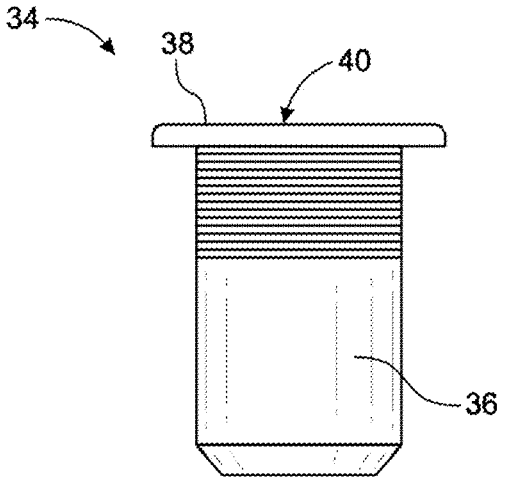
FIG. 4B
Amended

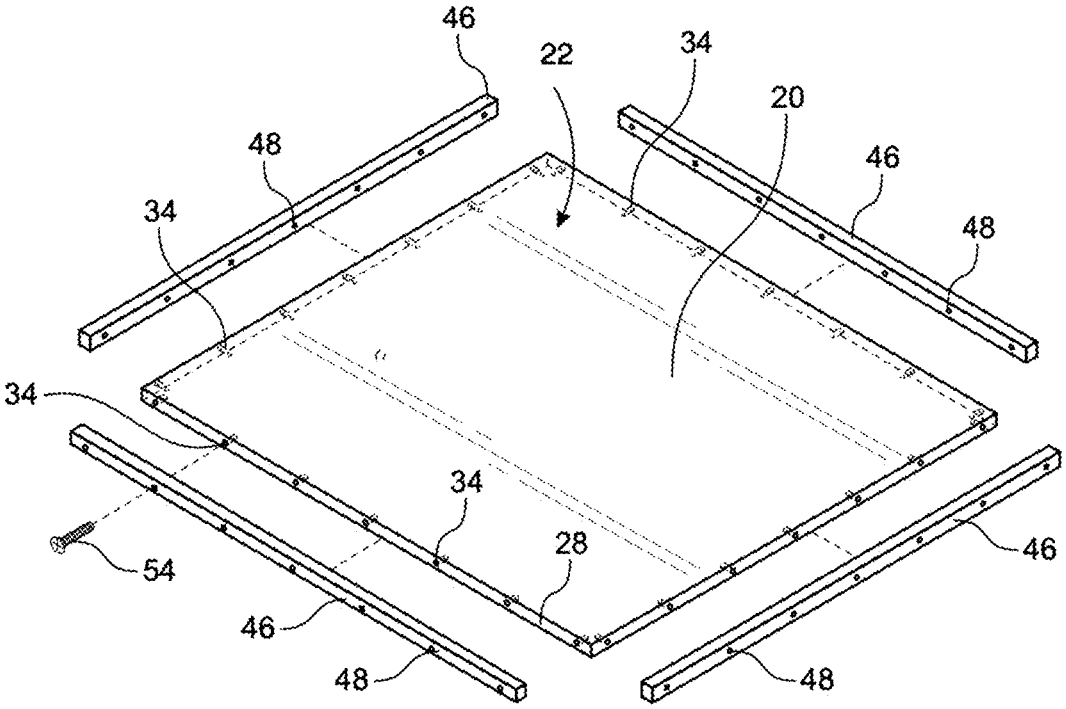
FIG. 10
Amended

TABLE TENNIS TOP AND MATERIAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. Nonprovisional patent application Ser. No. 17/397,988, filed on Aug. 10, 2021, now U.S. Pat. No. 11,224,790, issued on Jan. 18, 2022, entitled "Table Tennis Top And Material"*, which claims priority to and benefit of U.S. Provisional Patent Application No. 63/192,669, filed on May 25, 2021, the contents of which are incorporated by reference in [its entirety] *their entireties*.

FIELD OF THE DISCLOSURE

The present invention relates to structures and materials for playing table tennis, and more specifically to a frameless table tennis top and materials thereof.

BACKGROUND OF THE INVENTION

The game of table tennis or ping-pong is a sport, which includes a table, a vertical net and opposing playing areas. Two or four players hit a lightweight ball back and forth across the net using small rackets until a point is scored. Typically, the table comes in a rectangular shape and the net separates the table into two equal size playing areas.

Several attempts have been made in the past to improve the structures and materials for playing table tennis. One such example is disclosed in a Chinese Publication No. 108325188, entitled, "All-weather table tennis table-board adopting novel material" ("the '188 Publication"). The '188 Publication discloses an all-weather table tennis table-board adopting a novel material. The table-board is a multi-layer structure, and an interlayer of the table-board is a metal hollow structure; the two faces of the interlayer are covered with monolayer or multilayer metal cover plates; an inner surface layer of each metal cover plate is combined with an interlayer material, and the outer surface layers of the metal cover plates are processed by coating or film covering; and edge sealing processing is carried out on the peripheries of the table-board of the metal cover plates. According to the all-weather table tennis table-board adopting the novel material, a metal material and a stable netty hollow structure are adopted, compared with a traditional table tennis table-board, the all-weather table tennis table-board has the advantages that weight stiffness is good, the intensity is high, the pressure resistance is strong, the corrosion resistance is achieved, and the aging is uneasy, the all-weather table tennis table-board cannot be affected by the humid environment, the waterproof property is excellent, the deformation is uneasy, the better flatness is achieved, the all-weather table tennis table-board can be cooperatively assembled with tables adopting different materials to form a complete table tennis table, and all indicators meet the requirements of competition and training.

Another example is disclosed in a U.S. Pat. No. 4,142,718, entitled "Table tennis table" ("the '718 Patent"). The '718 Patent discloses a weatherproof table tennis table that includes a table top and an integrally made bent lateral rim. The table tennis table comprises a composite plate of a thermoplastic plastics core and two metal facing sheets, a rectangular-shaped frame, and brackets for folding legs, the frame and brackets being connected rigidly to the rim.

Yet another example is disclosed in a Chinese Publication No. 206081541, entitled, "Portable combination formula table tennis table who makes things convenient for field usage" ("the '541 Publication"). The '541 Publication discloses a sport equipment that includes the table tennis table body, the table tennis table body includes the table desktop, and the table desktop comprises left platen, well platen and right platen. The contents of all patents, patent applications, and non-patent literature are incorporated by reference in their entireties for all purposes.

In the above-discussed disclosures, the applicants designed the table top of the tennis table using materials and construction methods that yield tables which are extremely heavy and semi-permanent/not able to be quickly deconstructed. This is because the table tops are exclusively made of high density fiberboard (HDF) or thick aluminum plating, both of which are inherently heavy and therefore require a permanently attached supporting frame. The resulting products are therefore difficult to ship, lift, or otherwise move, and are difficult to store. HDF tables additionally suffer from extreme sensitivity to weather conditions and deformation due to moisture. Aluminum tables offer a weatherproof "outdoor" alternative to "indoor" tables, but are more expensive due to materials used and suffer from a lower bounce height than HDF tables.

In view of the above, there remains a continuing need for improved structures and materials for playing table tennis.

BRIEF SUMMARY OF THE PRESENT INVENTION

It is an object of the present invention to provide improved structures and materials for playing table tennis and that avoids the drawbacks of known table tops of tennis tables.

It is another object of the present invention to provide a table tennis apparatus having a table top made of a fiberglass-reinforced structural material (FRSM). The table top that is capable of solving the problem of the heavy weight of existing table tennis tables, the difficulties in storing them.

It is another object of the present invention to provide a frameless table that is easy to store, while still adhering to strict standards for table tennis table performance as laid out by the International Table Tennis Federation (ITTF).

It is another object of the present invention to provide a table top that is lightweight and has a good stiffness without any deflection.

In order to achieve one or more objects, the present invention provides a table tennis apparatus having a pair of tables. Each table includes a table top. The table top includes a three-layered composite panel made up of a fiberglass reinforced structural material (FRSM). The table top includes panel holes along its sides. The panel holes fill with expanding spray insulation adhesive or spray insulation foam. Subsequently, the panel holes receive a plurality of rivets. Here, the rivets insert into the panel holes when the spray insulation adhesive has not cured and is still wet. The outer portion of the rivets is made twist resistant such that the rivets snugly fit and remain firmly inside the panel holes upon insertion. Each rivet includes a fastener receiving section.

The table top receives aluminum plates at its sides. The plates include a plurality of plate holes. The plates align with the table top at its sides such that the plate holes align with the panel holes. Subsequently, fasteners insert through the plate holes and into the fastener receiving sections in the rivets.

The table top includes mounting brackets at its bottom surface. The mounting brackets include male members. The male members extend perpendicularly to the mounting brackets and fold over the mounting brackets. Each table further includes legs comprising female members. The male members insert into the female members connecting the legs to the mounting brackets. The male members extend for positioning the legs perpendicularly to the ground such that the table top rests at a height from the ground and allows its top surface to act as a playing surface for playing the game of table tennis.

In one advantageous feature of the present invention, the table top utilizes FRSM material which is extremely lightweight with good stiffness and mechanical properties. As such, the table top no longer needs a frame to stabilize the table from deflection. The legs directly attach to the table top. This makes the table collapsible and streamlined/frameless, so is superiorly portable and storable. The combination of table top utilizing FRSM material and the detachable legs result in extremely lightweight, superiorly portable, and storable table tennis table, while still achieving a professional bounce in accordance with the International Table Tennis Federation's (ITTF' s) strict standards for indoor table tennis table's ball bounce height, consistency, and frictional coefficient.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

FIGS. 4A and 4B illustrate a perspective view and a front view, respectively of a rivet, in accordance with one embodiment of the present invention;

FIG. 10 illustrates a feature of the plates aligned with the table top from all sides;

DETAILED DESCRIPTION OF EMBODIMENTS

Figure 1:
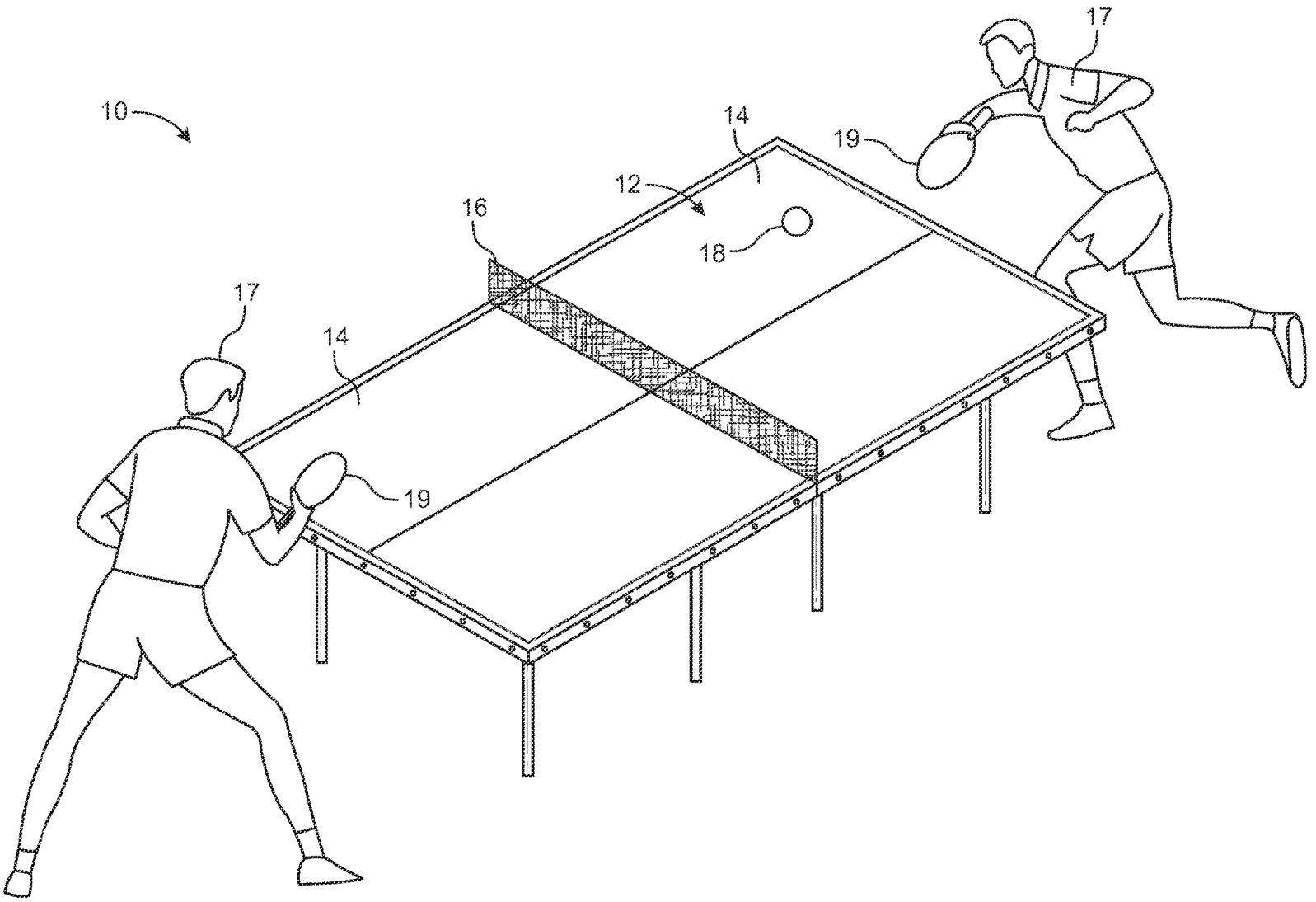
FIG. 1 illustrates an environment of a table tennis apparatus, in accordance with one exemplary embodiment of the present invention.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or"includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above"or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

Turning to the Figures, FIG. 1 shows an environment 10 in which table tennis apparatus 12 is used to play a game of table tennis, in accordance with one exemplary embodiment of the present invention. Table tennis apparatus 12 includes a pair of table tennis tables or simply tables 14. Tables 14 separate by net 16. Two or four players 17 play the game of table tennis by hitting a lightweight ball 18 back and forth across net 16 using small rackets 19 until a point is scored.

Figure 2:
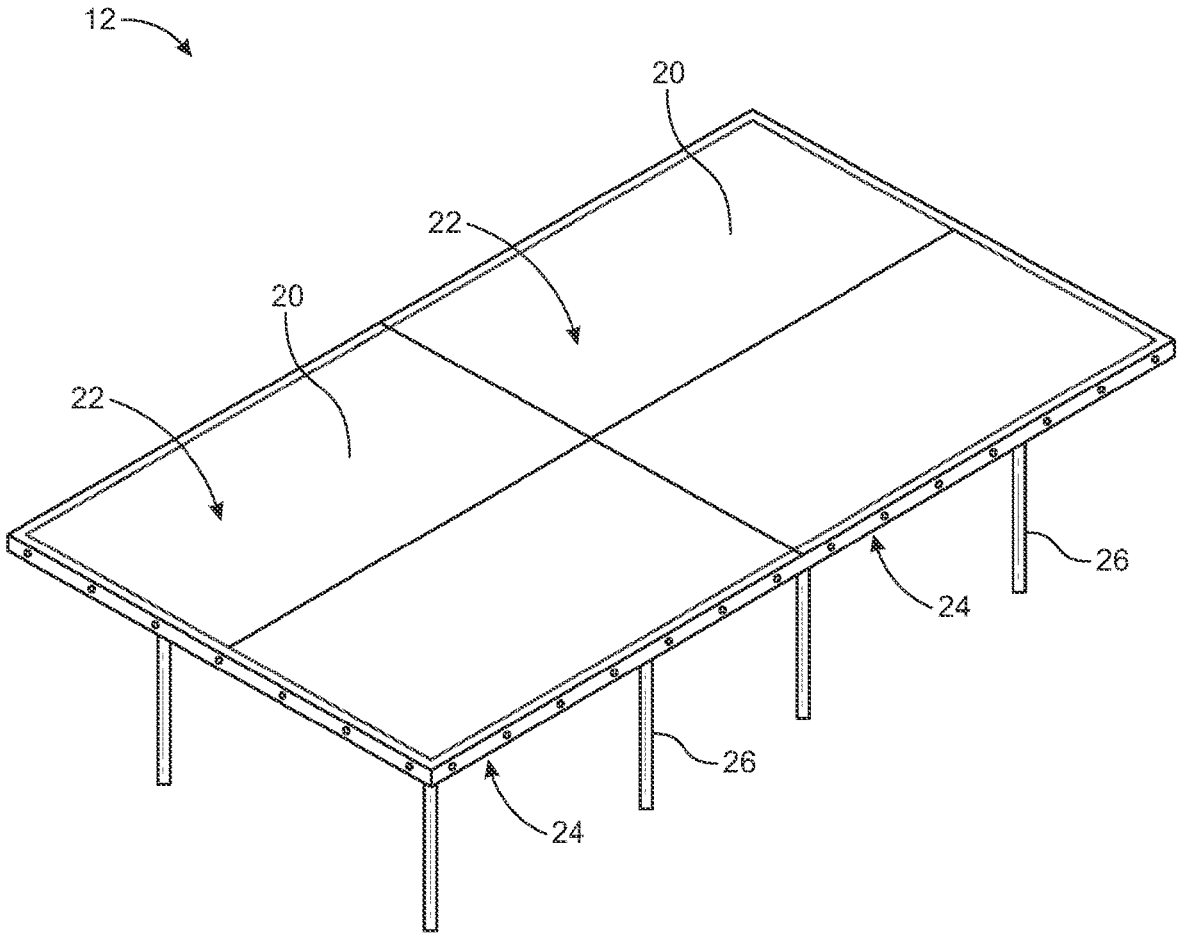
FIG. 2 is a top perspective of the table tennis apparatus.

FIG. 2 shows a perspective view of table tennis apparatus 12, in accordance with one embodiment of the present invention. As can be seen, each table 14 includes table tennis top 20 or simply table top 20. Table top 20 provides a flat and rectangular panel. In one example, table top 20 has a thickness ranging from 1.5 inches to 2 inches. Table top 20 presents top surface 22 and bottom surface 24. Each table 14 further includes legs 26 that extend from bottom surface 24 of table top 20 and allow to place table top 20 at a height from the ground. Table top 20 presents sides 28 corresponding to its rectangular shape.

Figure 3:
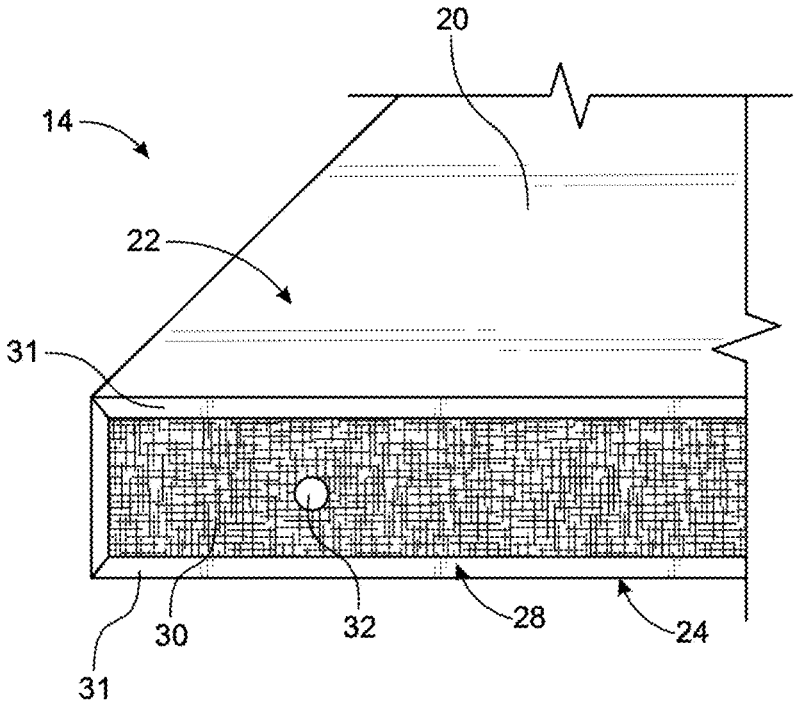
FIG. 3 is a side perspective of a table top, in accordance with one embodiment of the present invention.

FIG. 3 shows a side perspective of table top 20. In one example, table top 20 comes as a three-layered composite panel made up of a fiberglass reinforced structural material (FRSM). Here, table top 20 includes inner layer 30 (single layer) and outer layers 31 (two layers) sandwiching inner layer 30. Inner layer 30 presents a plastic honeycomb core layer of the FRSM, which is partially hollow. Outer layers 31 present a material made of a gel-coated fiberglass. In one example, considering that table top 20 has a thickness of 1.5 inches, inner layer 20 has a thickness of about 24 mm and each outer layer 31 has a thickness of about 7 mm. In accordance with one embodiment of the present invention, table top 20 includes panel holes or pilot holes 32 at the sides 28. In one example, panel holes 32 are drilled into sides 28 of table top 20. In one example, panel holes 32 position at inner layer 30 as shown in FIG. 3. Panel holes 32 position at equal distance from one another. However, it is possible to position panel holes 32 at varied distances from one another and at various positions along sides 28 of table top 20 depending on the need.

Figure 4A:
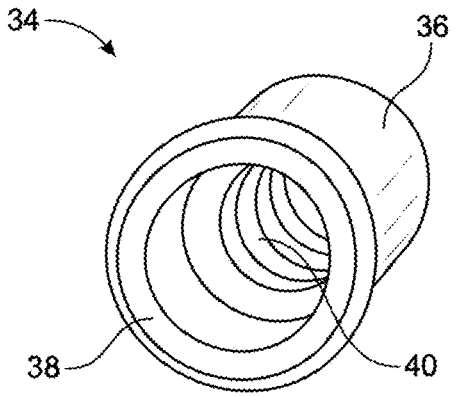

In the present embodiment, panel holes 32 receive rivet nuts or simply rivets 34. FIGS. 4A and 4B show a perspective view and a front view, respectively of rivet 34, in accordance with one embodiment of the present invention. Rivet 34 provides a material made of metal such as steel, for example. Each rivet 34 includes body 36 and neck 38 extending from body 36. Outer portion of body 36 is made with twist resistant variety such that rivet 34 snugly fits and remains firmly inside panel hole 32 upon insertion. Body 36 has a hollow area or fastener receiving section 40. Fastener receiving section 40 is threaded to receive fastener 54.

Figure 5:
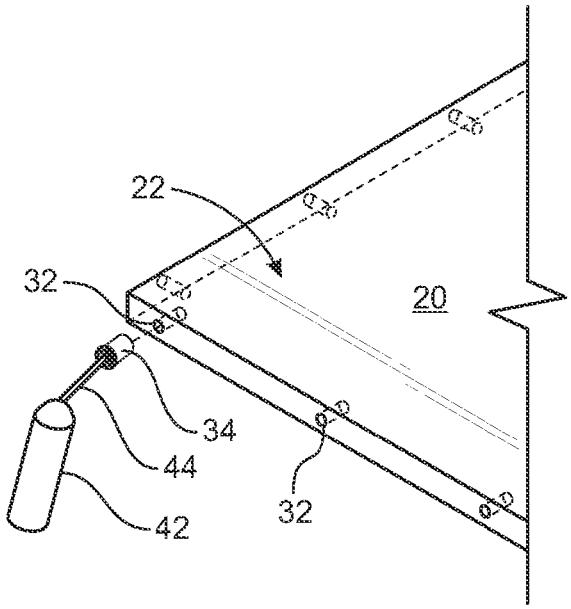
FIG. 5 illustrates a feature of the rivet pushed into a foam filled panel hole immediately after filling the foam, in accordance with one embodiment of the present invention.
Figure 6:
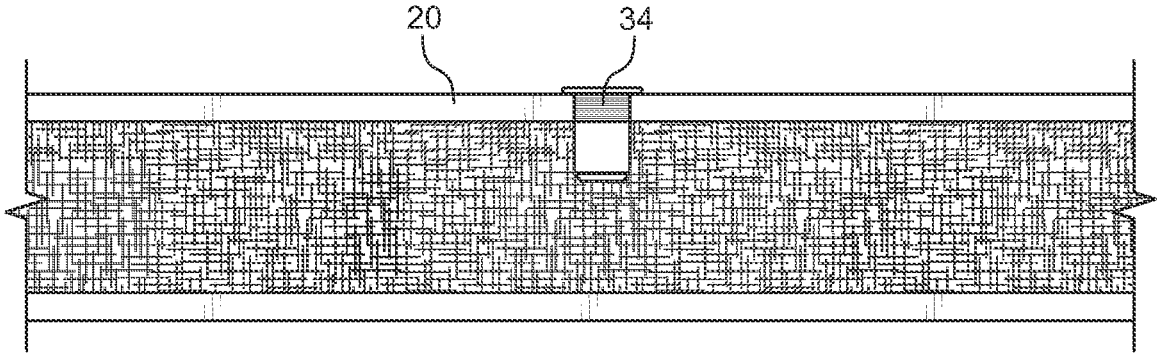
FIG. 6 illustrates a feature of the rivet inserted into the table top, in accordance with one embodiment of the present invention.

In one embodiment, panel holes 32 is filled with expanding spray insulation adhesive or spray insulation foam prior to insertion of rivets 34. Here, container or can 42 containing expanding spray insulation adhesive or foam is used to fill panel holes 32. Container 42 includes applicator tube 44. Applicator tube 44 sprays/fills expanding spray insulation adhesive into panel holes 32 of table top 20. After filling, rivet 34 inserts through foam filled panel hole 32. Here, rivet 34 inserts immediately after the expanding spray insulation adhesive is filled/applied such that the expanding spray insulation adhesive has not cured and is still wet. FIG. 5 shows a feature of rivet 34 pushed into the expanding spray insulation adhesive filled panel holes 32 immediately after filling the expanding spray insulation adhesive, in accordance with one exemplary embodiment of the present invention. FIG. 6 shows a feature of rivet 34 inserted into table top 20, in accordance with one exemplary embodiment of the present invention. As can be seen, the insertion of rivet 34 forms a flush or flat surface at the side 28 of table top 20.

Figure 7:
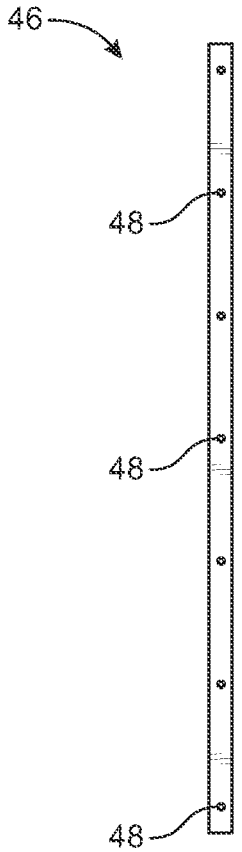
FIGS. 7 and 8 illustrate a top view and a perspective view, respectively of a plate, in accordance with one embodiment of the present invention.
Figure 8:
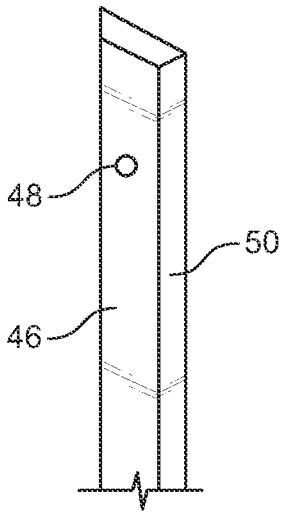
Figure 9:
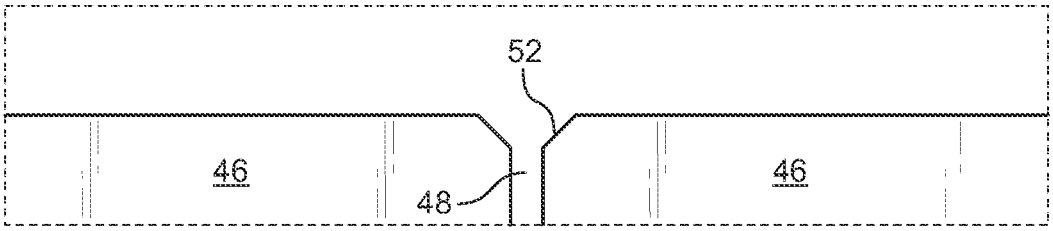
FIG. 9 illustrates a feature of the plate hole having a tapered section.

In the current embodiment, table top 20 receives elongated and rectangular shaped plates 46 around each side 28. In other words, table top 20 of each of the tables 14 receives four plates 46 (four sides 28 of the rectangular panel). FIG. 7 shows a top view of plate 46, in accordance with one embodiment of the present invention. Plates 46 provide a material made of metal, plastic or any other suitable material. Preferably, plates 46 are made of metal such as aluminum. Plates 46 have a length and width corresponding to the length and width of sides 28 of table top 20. As specified above, table top 20 comes in a rectangular shape. As such, two plates 46 have equal and longer dimension than other two plates 46 and four plates 46 together covers all sides 28 of table top 20. Plates 46 come with a suitable thickness depending on the need. In one example, each plate 46 comes with dimensions of 60 inches in length, 1.5 inches in width and $\frac{1}{8}^{th}$ inch thickness. However, a person skilled in the art understands that the length and width of plates 46 depend on the length and width of table top 20. Plates 46 include plate holes or countersunk holes 48. In one example, plate 46 has an angle cut 50 of approximately 45 degrees, as shown in FIG. 8. In one example, plate holes 48 tapered, such that tapered section 52 has an angle of about 100 degrees, as shown in FIG. 9. Each plate hole 48 encompasses tapered section 52 to receive fastener 54 and provides a flush surface.

Figure 11:
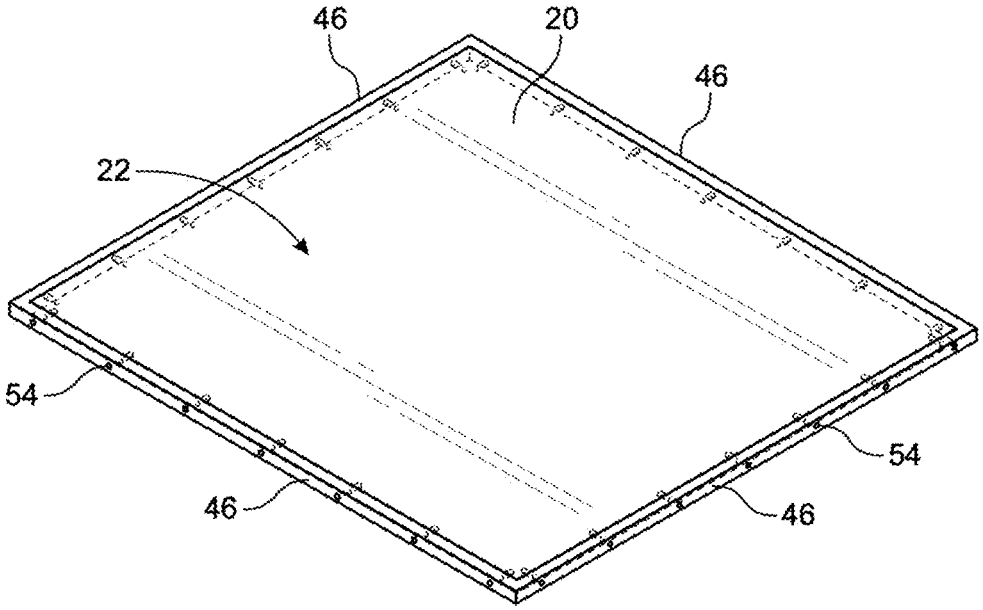
FIG. 11 illustrates a top perspective view of the table top in which the plates connect the table top at its sides.

FIG. 10 shows a feature of plates 46 aligned with table top 20 from all sides 28, in accordance with one embodiment of the present invention. As can be seen, plates 46 are aligned with table top 20 such that plate holes 48 align with rivets 34 inserted in panel holes 32 of table top 20. After aligning, fasteners 54 insert through plate holes 48 and fastener receiving section 40 in rivets 34 to connect plates 46 to table top 20. FIG. 11 shows a top perspective view of table top 20 in which plates 46 connect table top 20 at its sides 28, in accordance with one embodiment of the present invention. As can be seen, sides and edges of table top 20 are strengthened and sealed with strips of plates 46. In accordance with the present invention, plates 46 attach to table top 20 using a novel method of drilling panel holes 32 into table top 20, filling panel holes 32 with expanding spray insulation adhesive (foam), inserting rivets 34 while still wet, and plates 46 using the still wet rivets 34 for a hardened joint.

Figure 12:
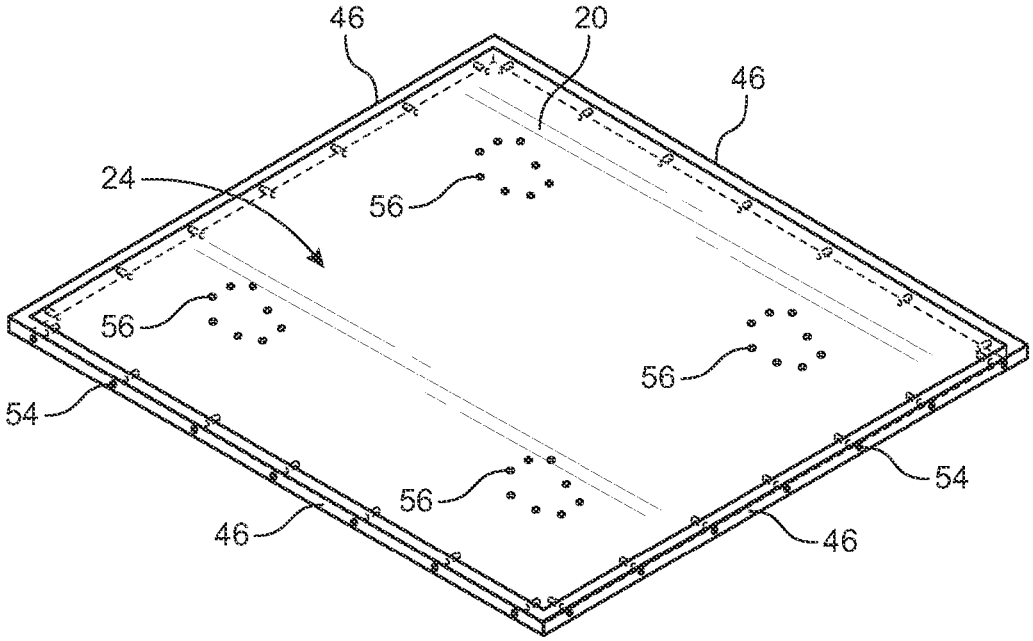
FIG. 12 illustrates a bottom perspective view of the table top, in accordance with one embodiment of the present invention.
Figure 13:
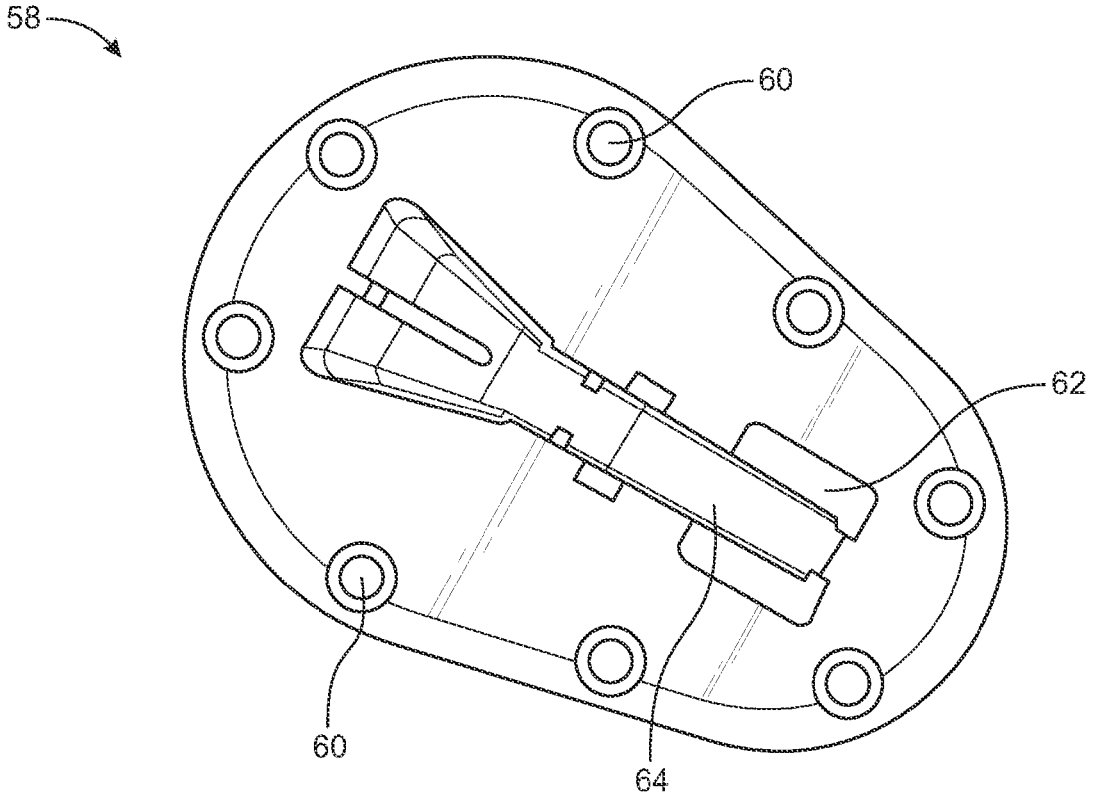
FIG. 13 illustrates a perspective of a mounting bracket.
Figure 14:
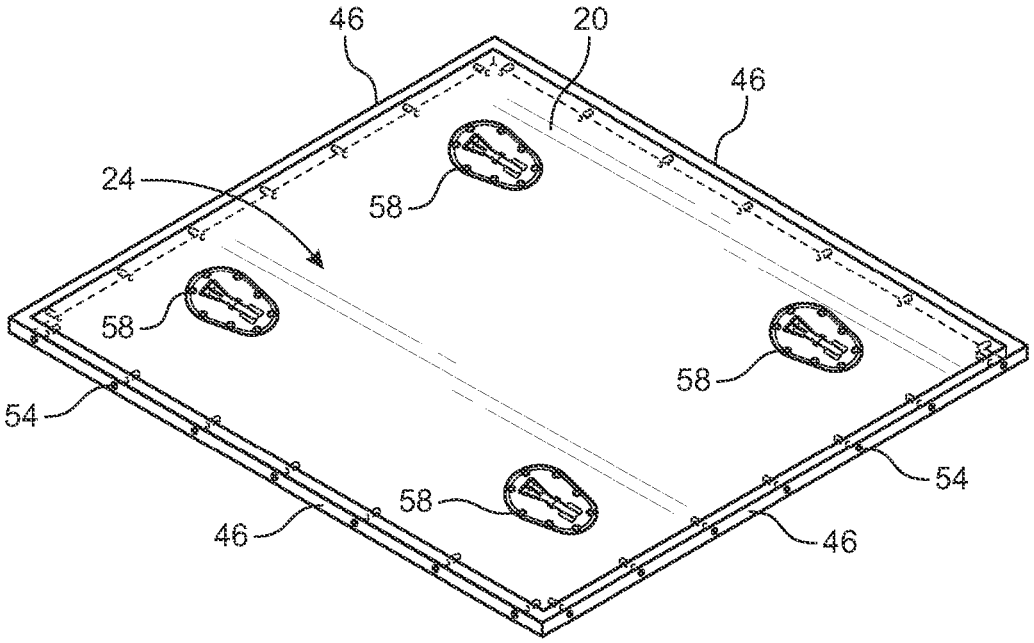
FIG. 14 illustrates a bottom perspective view of the table top connecting the mounting brackets, in accordance with one embodiment of the present invention.

FIG. 12 shows a bottom perspective view of table top 20, in accordance with one embodiment of the present invention. At the bottom surface 24, table top 20 includes holes 56 positioned to receive mounting brackets 58. Holes 56 position substantially closer to the edges or sides 28 of table top 20. In one example, holes 56 fill with insulation foam similar to panel holes 32 explained above prior to insertion of rivets or fasteners. FIG. 13 shows a perspective of mounting bracket 58, in accordance with one embodiment of the present invention. In one example, mounting bracket 58 comes in a square, rectangular, oval, circular or any other shape. Mounting bracket 58 provides a material made of plastic, metal or any other suitable material. Mounting bracket 58 includes holes 60 for receiving fasteners (not shown). Mounting brackets 58 align with holes 56 on table top 20 and the fasteners insert through holes 60; 56 and connect mounting brackets 58 to table top 20 at its underside (bottom surface 24). Mounting brackets 58 include connecting plate 62 for connecting male member 64. Male member 64 hingedly connects to connecting plate 62 and extends perpendicularly to mounting bracket 58 and folds falling over mounting bracket 58. In accordance with the present invention, table top 20 includes four mounting brackets 58 at the corners and receive legs 26 to place table top 20 at a height from the ground. However, it is possible to provide any number of mounting brackets 58 for connecting legs 26 depending on the need. FIG. 14 shows a bottom perspective view of table top 20 connecting mounting brackets 58, in accordance with one embodiment of the present invention.

Figure 15A:
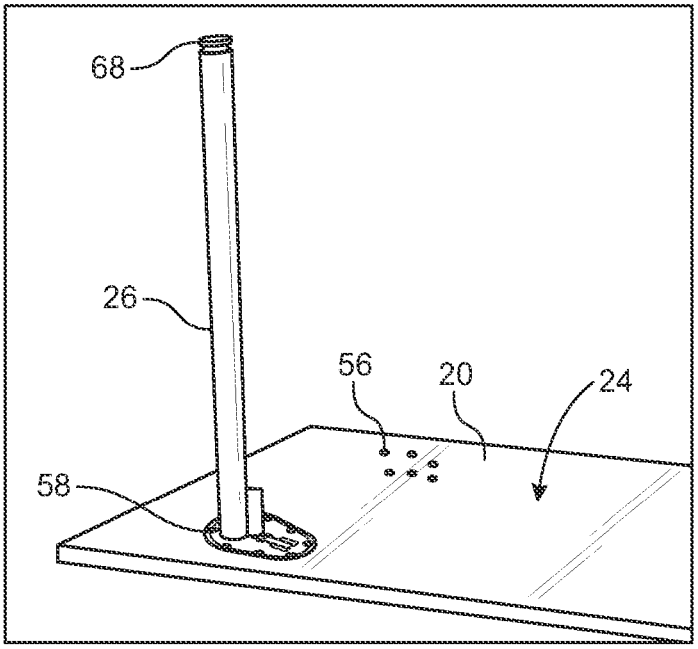
FIGS. 15A through 15E illustrate the connection and operation of legs with respect to the mounting brackets, in accordance with one embodiment of the present invention.
Figure 15B:
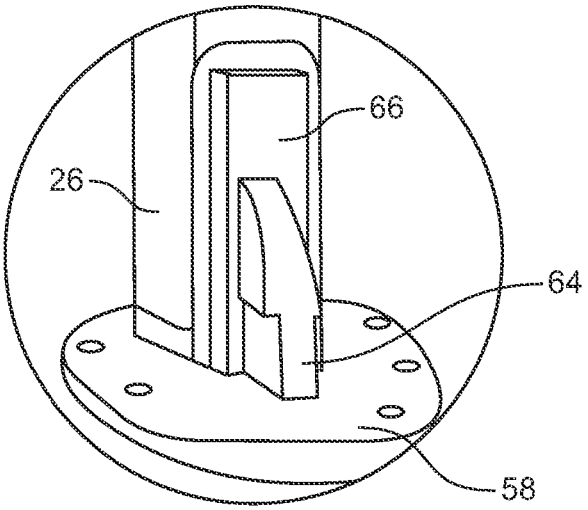
Figure 15C:
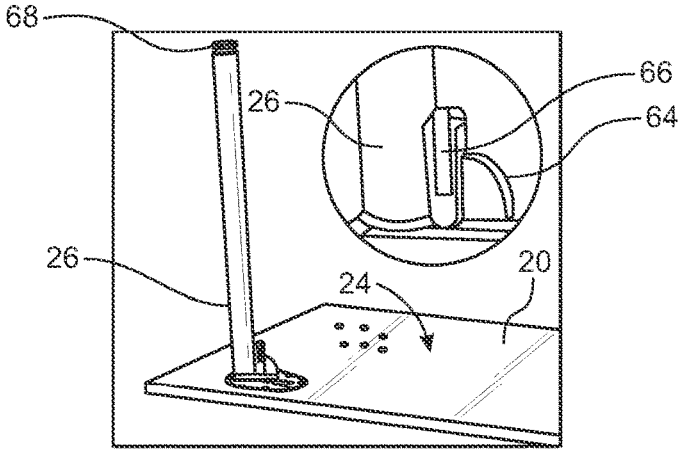
Figure 15D:
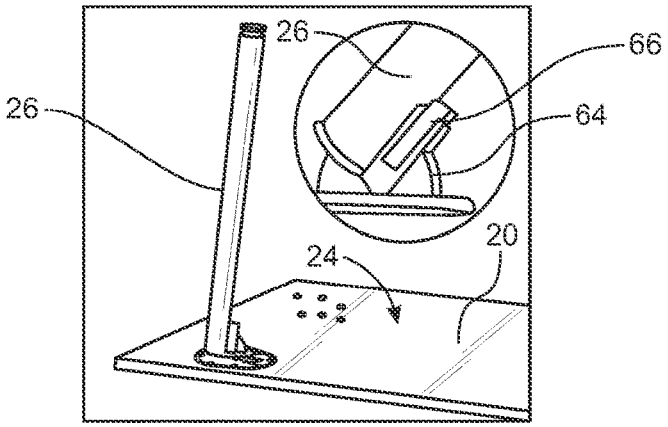
Figure 15E:
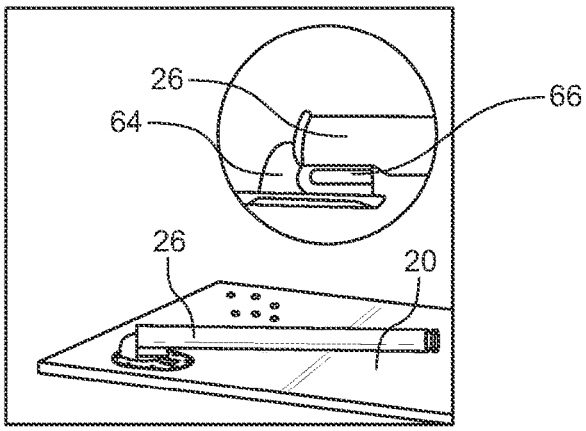
Figure 16:
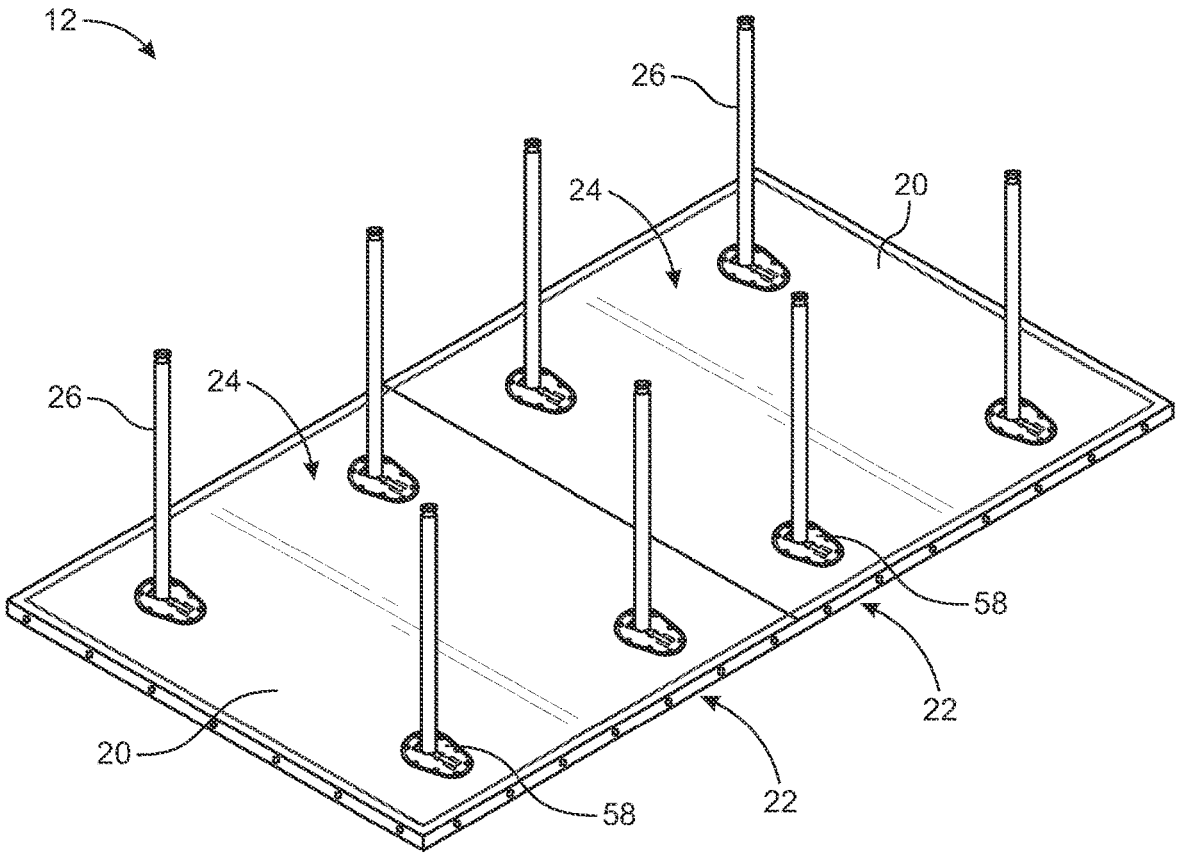
FIG. 16 illustrates a bottom perspective view of the table tennis apparatus, in accordance with one embodiment of the present invention.

In the current embodiment, legs 26 include female member 66 at one (proximal) end and height adjusting member 68 at another (distal) end. Height adjusting member 68 indicates a structure that mounts to leg 26 at its distal (as a foot). Height adjusting member 68 connects/screws and unscrews to leg 26 up to 1 to ⅛inch for height adjustment by twisting. Each leg 26 aligns with mounting bracket 58 such that female member 66 aligns with male member 64. Here, male member 64 extends perpendicularly to mounting bracket 58, as shown in FIGS. 15A and 15B. Subsequently, leg 26 is pushed such that male member 64 inserts into female member 66 in a snap-fit mechanism making a click sound thereby connecting leg 26 to mounting bracket 58, as shown in FIG. 15C. Player 17 holds leg 26 and applies pressure from one side (FIG. 15D) such that male member 64 folds resting leg 26 on table top 20, as shown in FIG. 15E. In other words, mounting brackets 58 with hinged male member 64 allow to fold legs 26. Folding of legs 26 helps to reduce the space required to store tables 14 when not in use. When needed, players 17 extend/unfold legs 26 perpendicularly to table top 20, as shown in FIG. 16. Subsequently, players 17 position tables 14 such that legs 26 face the ground as shown in FIG. 2. As specified above, legs 26 include height adjusting member 68 at the distal end. Height adjusting member 68 ensure legs 26 position at required height from the ground for placing table top 20 at playing surface level. After positioning tables 14, players 17 play the game of table tennis by hitting ball 18 back and forth across net 16 using small rackets 19 until a point is scored.

The embodiments provide for several advantages over the prior art. For example, the table top is made out of fiberglass reinforced structural material (FRSM) with legs that directly attach to the table top. The FRSM is extremely light-weight with good stiffness and mechanical properties, allowing for a top playing surface that requires no supporting frame to be attached. This, combined with the inherent light weight of FRSM, results in an extremely lightweight, superiorly portable, storable, table tennis table, while still achieving a professional bounce in accordance with the International Table Tennis Federation's (ITTF's) strict standards for indoor table tennis table's ball bounce height, consistency, and frictional coefficient. Further, the FRSM material used in the table top is a three-layered composite panel.

In comparison to traditional table tennis table designs and materials, the presently disclosed table top provides a lighter weight playing surface with good stiffness and no deflection. Additionally, the table top is waterproof and impervious to breaking down in any way due to environmental conditions. The table top's design allows for the table top to be frameless for much easier storage, while still adhering to strict standards for table tennis table performance as laid out by the ITTF. As such, the presently disclosed table tennis apparatus solves the problem of the heavy weight of table tennis tables, the difficulties in storing them as it can fully collapse easily.

Based on the above, it is evident that the presently disclosed table tennis apparatus is much lighter weight, completely weatherproof and doesn't possess a frame. The presently disclosed table tennis apparatus makes storability, portability, and movability much easier without sacrificing quality in the playing surface. Further, the table top composed of a fiberglass-reinforced structural honeycomb panel, with aluminum plates siding provide protection and structural integrity.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A table tennis apparatus, comprising:

a pair of tables, each table having:

a table top comprising a three-layered composite panel, wherein the three-layered composite panel comprises an inner layer and outer layers sandwiching the inner layer, wherein the inner layer comprises a plastic honeycomb core layer of a fiberglass reinforced structural material (FRSM), and wherein the outer layers comprise a material made of a gel-coated fiberglass, wherein the table top comprises a top surface, a bottom surface, and sides;

plates [connecting] *connected to* the table top at the sides;

*leg assemblies comprising respective mounting brackets, male members, and legs,*

*the* mounting brackets [connecting at] *connected to* the bottom surface of the table top;

*the* male members [connecting] *connected* to the mounting brackets, wherein the male members extend perpendicularly to the mounting brackets and fold over the mounting brackets; and,

*the* legs comprising female members, wherein the male members insert into the female members for connecting the legs to the mounting brackets, *and the leg assemblies being directly attached to the bottom surface of the table top* [making the table top to be frameless] *without a supporting frame*; and,

*wherein the sides of the table top terminate at the bottom surface of the table top, and the sides of the table top are entirely disposed above the legs of the table; and* wherein the male members extend for positioning the legs perpendicularly to a ground such that the table top rests at a height from the ground and allows the top surface of the table top to act as a playing surface for playing table tennis.

2. The table tennis apparatus of claim 1, wherein the table top comprises panel holes at its sides, and wherein the panel holes fill with an expanding spray insulation adhesive.

3. The table tennis apparatus of claim 2, further comprising a plurality of rivets, wherein the plurality of rivets insert into the panel holes, and wherein the panel holes fill with the expanding spray insulation adhesive prior to insertion of the plurality of rivets.

4. The table tennis apparatus of claim 3, wherein each of the plurality of rivets comprises a fastener receiving section, wherein the fastener receiving section comprises a threaded portion.

5. The table tennis apparatus of claim 4, further comprising fasteners, wherein each of the fasteners inserts through a plate hole and into one of the plurality of rivets, wherein each of the [fastener] *fasteners* connects to the threaded portion of at least one of the plurality of rivets.

6. The table tennis apparatus of claim 2, wherein each of the plates comprises a plurality of plate [hole] *holes* that aligns with the panel holes when the plates connect to the table top.

[7. The table tennis apparatus of claim 1, wherein the three-layered composite panel is cut at an edge along its length at an angle of about 45 degrees.]

8. The table tennis apparatus of claim 1, wherein each of the legs comprises a height adjusting member at its distal end, wherein the height adjusting member comes in contact with a ground and helps to adjust the height of *the* leg from the ground.

9. A table tennis apparatus, comprising:

a pair of tables, each table having:

a table top comprising a three-layered composite panel, wherein the three-layered composite panel comprises an inner layer and outer layers sandwiching the inner layer, wherein the inner layer comprises a plastic honeycomb core layer of a fiberglass reinforced structural material (FRSM), and wherein the outer layers comprise a material made of a gel-coated fiberglass, wherein the table top comprises a top surface and a bottom surface and sides, wherein the table top comprises panel holes at its sides, and wherein the panel holes fill with an expanding spray insulation adhesive;

a plurality of rivets inserted into the panel holes when [an] *the expanding spray* insulation adhesive has not cured and is still wet;

plates comprising plate holes, wherein the plates connect to the table top at the sides such that the plate holes align with the panel holes, and wherein the plates comprise fasteners that insert through the plate holes and into the plurality of rivets; [and,]

*leg assemblies comprising respective legs;*

*the* legs extending from the bottom surface of the table top*, and the leg assemblies being directly attached to the bottom surface of the table top* [making the table top to be frameless] *without a supporting frame*; *and,*

*wherein the sides of the table top terminate at the bottom surface of the table top, and the sides of the table top are entirely disposed above the legs of the table.*

10. The table tennis apparatus of claim 9, further comprises mounting brackets at the bottom surface of the table top, wherein the mounting brackets receive the legs.

11. The table tennis apparatus of claim 10, wherein each of the mounting brackets comprises a male member, wherein the male member extends perpendicularly from each of the mounting brackets and folds over the mounting brackets.

12. The table tennis apparatus of claim 11, wherein the legs comprise female members, wherein each of the male members inserts into the female members connecting the legs to the mounting brackets, wherein each of the male members extend for positioning the legs perpendicularly to a ground such that the table top rests at a height from the ground and allows the top surface of the table top to act as a playing surface for playing a game of table tennis.

13. The table tennis apparatus of claim 9, wherein each of the rivets comprises a fastener receiving section, wherein the fastener receiving section comprises a threaded portion, and wherein each of the [fastener] *fasteners* inserts into the fastener receiving section.

14. The table tennis apparatus of claim 9, wherein each of the legs comprises a height adjusting member at its distal end, wherein the height adjusting member comes in contact with a ground and helps to adjust the height of *the* leg from the ground.

15. A method of providing a table tennis apparatus, the method comprising steps of:

providing a pair of tables, each table comprising a table top, the table top having a top surface, a bottom surface, and sides, the table top comprising a three-layered composite panel, the three-layered composite panel having an inner layer and outer layers sandwiching the inner layer, the inner layer comprising a plastic honeycomb core layer of a fiberglass reinforced structural material (FRSM), and the outer layers comprising a material made of a gel-coated fiberglass;

providing plates, the plates [connecting] *connected to* the table top at the sides;

*providing leg assemblies comprising respective mounting brackets, male members, and legs;* providing *the* mounting brackets at the bottom surface of the table top;

providing *the* male members at the mounting brackets, the male members extending perpendicularly from the mounting brackets and folding over the mounting brackets;

providing *the* legs [comprising] *with* female members;

inserting the male members into the female members for connecting the legs to the mounting brackets*, and the leg assemblies being directly attached to the bottom surface of the table top* [making the table top to be frameless] *without a supporting frame*; and extending the male members for positioning the legs perpendicularly to a ground such that the table top rests at a height from the ground and allows the top surface of the table top to act as a playing surface for playing a game of table tennis*;*

*wherein the sides of the table top terminate at the bottom surface of the table top, and the sides of the table top are entirely disposed above the legs of the table.*

16. The method of claim 15, further comprising:

providing panel holes at sides of the table top; and inserting rivets into the panel holes.

17. The method of claim 16, further comprising filling the panel holes with an expanding spray insulation adhesive prior to insertion of the rivets.

18. The method of claim 17, further comprising providing a fastener receiving section at each of the rivets, the fastener receiving section comprising a threaded portion for receiving a fastener through [at least] one *of a plurality of* plates holes of the plates.

*19. A table tennis apparatus, comprising:*

*a pair of tables, each table having:*

*a table top comprising a three-layered composite panel, wherein the three-layered composite panel comprises an inner layer and outer layers sandwiching the inner layer, wherein the inner layer comprises a plastic honeycomb core layer of a fiberglass reinforced structural material (FRSM), and wherein the outer layers comprise a material made of a coated fiberglass, wherein the table top comprises a top surface, a bottom surface, and sides;*

*leg assemblies comprising respective legs, the leg assemblies being directly attached to the bottom surface of the table top without a supporting frame, and the legs extending from the bottom surface of the table top, each leg comprising an elongate leg member with a longitudinal axis extending from the bottom surface of the table top; and,*

*wherein the sides of the table top terminate at the bottom surface of the table top, and the sides of the table top are entirely disposed above the legs of the table; and*

*wherein the legs extend to a ground such that the table top rests at a height from the ground and allows the top surface of the table top to act as a playing surface for playing table tennis.*

*20. The table tennis apparatus of claim 19, further comprising plates configured to be connected to the sides of the table top.*

*21. The table tennis apparatus of claim 20, wherein the table top comprises panel holes at the sides of the table top, and each of the plates comprises a plurality of plate holes that align with the panel holes when the plates connect to the table top.*

*22. The table tennis apparatus of claim 21, further comprising a plurality of fasteners, wherein each of the plurality of fasteners inserts through one of the plurality of plate holes and into one of the panel holes so as to connect one of the plates to a respective one of the sides of the tabletop.*

*23. The table tennis apparatus of claim 19, wherein at least one of the legs comprises a height adjusting member at its distal end, wherein the height adjusting member comes in contact with a ground and helps to adjust the height of the leg from the ground.*

* * * * *